(12) United States Patent
Zinn

(10) Patent No.: US 8,753,720 B2
(45) Date of Patent: Jun. 17, 2014

(54) NANO-STRUCTURED REFRACTORY METALS, METAL CARBIDES, AND COATINGS AND PARTS FABRICATED THEREFROM

(71) Applicant: Lockheed Martin Corporation, Bethesda, MD (US)

(72) Inventor: Alfred A. Zinn, Palo Alto, CA (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 13/891,597

(22) Filed: May 10, 2013

(65) Prior Publication Data

US 2013/0251900 A1 Sep. 26, 2013

Related U.S. Application Data

(62) Division of application No. 12/191,975, filed on Aug. 14, 2008, now abandoned.

(60) Provisional application No. 61/017,098, filed on Dec. 27, 2007.

(51) Int. Cl.
*B05D 3/02* (2006.01)

(52) U.S. Cl.
USPC ...................................... 427/376.1

(58) Field of Classification Search
USPC ...................................... 427/376.1
See application file for complete search history.

(56) References Cited

U.S. PATENT DOCUMENTS

| 3,713,865 A | 1/1973 | Leeds |
| 3,811,920 A | 5/1974 | Galasso et al. |
| 4,835,002 A | 5/1989 | Wolf et al. |
| 5,159,171 A | 10/1992 | Cook et al. |

(Continued)

FOREIGN PATENT DOCUMENTS

| EP | 0960675 | 12/1999 |
| EP | 1683592 | 7/2006 |
| WO | WO-2009/115643 A2 | 9/2009 |
| WO | WO-2010/036114 A2 | 4/2010 |

OTHER PUBLICATIONS

Casolco, et al., "Transparent/translucent polycrystalline nanostructured yttria stabilized zirconia with varying colors", Scripta Materialia, 2007, pp. 1-4, Acta Materialia Inc., Elsevier Ltd.

(Continued)

*Primary Examiner* — Nathan Empie
(74) *Attorney, Agent, or Firm* — McDermott, Will & Emery LLP

(57) ABSTRACT

Refractory metal and refractory metal carbide nanoparticle mixtures and methods for making the same are provided. The nanoparticle mixtures can be painted onto a surface to be coated and heated at low temperatures to form a gas-tight coating. The low temperature formation of refractory metal and refractory metal carbide coatings allows these coatings to be provided on surfaces that would otherwise be uncoatable or very difficult to coat, whether because they are carbon-based materials (e.g., graphite, carbon/carbon composites) or temperature sensitive materials (e.g., materials that would melt, oxidize, or otherwise not withstand temperatures above 800° C.), or because the high aspect ratio of the surface would prevent other coating methods from being effective (e.g., the inner surfaces of tubes and nozzles). The nanoparticle mixtures can also be disposed in a mold and sintered to form fully dense components.

4 Claims, 12 Drawing Sheets

(56) References Cited

U.S. PATENT DOCUMENTS

| | | | | |
|---|---|---|---|---|
| 5,268,233 | A | * | 12/1993 | Heller et al. .................. 428/523 |
| 5,368,812 | A | * | 11/1994 | Calka et al. ........................ 419/5 |
| 6,645,444 | B2 | | 11/2003 | Goldstein |
| 6,846,565 | B2 | | 1/2005 | Korgel et al. |
| 6,875,374 | B1 | | 4/2005 | Zhan et al. |
| 6,878,184 | B1 | | 4/2005 | Rockenberger et al. |
| 6,911,385 | B1 | | 6/2005 | Haubrich et al. |
| 7,559,970 | B2 | | 7/2009 | Kim et al. |
| 7,628,840 | B2 | | 12/2009 | Atsuki et al. |
| 7,847,397 | B2 | | 12/2010 | Wu et al. |
| 7,850,933 | B2 | | 12/2010 | Yang et al. |
| 7,858,025 | B2 | | 12/2010 | Shim et al. |
| 2002/0025294 | A1 | | 2/2002 | Dugger |
| 2002/0045045 | A1 | | 4/2002 | Adams et al. |
| 2003/0086859 | A1 | | 5/2003 | Kawakami et al. |
| 2003/0161959 | A1 | | 8/2003 | Kodas et al. |
| 2004/0067659 | A1 | | 4/2004 | Black et al. |
| 2004/0247924 | A1 | | 12/2004 | Andres et al. |
| 2005/0008880 | A1 | | 1/2005 | Kunze et al. |
| 2005/0129580 | A1 | | 6/2005 | Swinehart et al. |
| 2005/0191492 | A1 | | 9/2005 | Yadav |
| 2006/0244164 | A1 | | 11/2006 | Didenko et al. |
| 2007/0167019 | A1 | | 7/2007 | Zurcher et al. |
| 2007/0175296 | A1 | | 8/2007 | Subramanian et al. |
| 2007/0202304 | A1 | | 8/2007 | Golovko et al. |
| 2007/0212538 | A1 | | 9/2007 | Niu |
| 2008/0278181 | A1 | | 11/2008 | Zhong et al. |
| 2009/0214764 | A1 | | 8/2009 | Li et al. |
| 2009/0301606 | A1 | | 12/2009 | Ueshima |

OTHER PUBLICATIONS

Chu, et al., "Reducing Action of Sodium Naphthalide in Tetrahydrofuran Solution. I. The Reduction of Cobalt(II) Chloride", J. Am. Chem. Soc., 1955, pp. 5838-5840, vol. 77, No. 22.

Kanninen, et al., "Influence of Ligand Structure on the Stability and Oxidation of Copper Nanoparticles", Journal of Colloid and Interface Science 318 (2008) pp. 88-95.

Kim, et al., "Consolidation and properties of binderless sub-micron tungsten carbide by field-activated sintering", International Journal of Refractory Metals & Hard Materials, 2004, pp. 257-264, vol. 22, Elsevier Ltd.

Kodash, et al., "Field-Assisted Sintering of Ni Nanopowders," Materials Science and Engineering A 385 (2004) pp. 367-371.

Lisiecki, et al., "Control of the Shape and the Size of Copper Metallic Particles", J. Phys. Chem 1996, 100, pp. 4160-4166.

Mott, et al., "Synthesis of Size-Controlled and Shaped Copper Nanoparticles", Langmuir 2007, 23, pp. 5740-5745.

Pulkkinen, et al., "Poly(ethylene imine) and Tetraethylenepentamine as Protecting Agents for Metallic Copper Nanoparticles", Applied Materials & Interface, (2009) vol. 1, No. 2, pp. 519-525.

Rahaman, Ceramic Processing and Sintering, 2nd Edition, (c) 2003 M. Dekker pp. 241-242 and 330-337.

Reed, Principles of Ceramics Processing 2nd Ed, (c) 1995 by John Wiley & Sons Inc. pp. 583-593.

Schrock, "Preparation and Characterization of M(CH3)5 (M=Nb or Ta) and Ta(CH2C6H5)5 and Evidence for Decomposition by α-Hydrogen Atom Abstraction", Journal of Organometallic Chemistry, 1976, pp. 209-225, vol. 122.

Sun, et al., "Monodisperse FePt Nanoparticles and Ferromagnetic FePt Nanocrystal Superlattices", Science, 2000, pp. 1989-1992, vol. 287, www.sciencemag.org.

Wu, et al., "One-Step Green Route to Narrowly Dispersed Copper Nanocrystals", Journal of Nanoparticle Research (2006) pp. 965-969.

Wu, et al., "Simple One-Step Synthesis of Uniform Disperse Copper Nanoparticles", Mater. Res. Soc. Symp, Proc. 2005, vol. 879E, pp. Z6.3.1-Z6.3.6.

Yeshchenko, et al., "Size-Dependent Melting of Spherical Copper Nanoparticles Embedded in a Silica Matrix", Physical Review B 75 (2007), pp. 085434-1 to 085434-6.

* cited by examiner

NANO-STRUCTURED REFRACTORY METALS, METAL CARBIDES, AND COATINGS AND PARTS FABRICATED THEREFROM

CROSS-REFERENCE TO RELATED APPLICATIONS

The present application is a divisional of U.S. patent application Ser. No. 12/191,975, filed on Aug. 14, 2008, which is incorporated herein by reference in its entirety for all purposes and claims the benefit of priority under 35 U.S.C. §119 from U.S. Provisional Patent Application Ser. No. 61/017,098 entitled "FORMATION OF NANO-STRUCTURED REFRACTORY CARBIDE COATINGS AND PARTS," filed on Dec. 27, 2007, the disclosure of which is hereby incorporated by reference in its entirety for all purposes. The present application is also related to U.S. patent application Ser. No. 11/798,529, entitled "RHENIUM NANOPARTICLES," filed on May 15, 2007, the disclosure of which is also hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to nano-structured refractory metals, metal carbides and, in particular, relates to methods and systems for manufacturing nano-structured refractory metals, metal carbides, and coatings and parts.

BACKGROUND OF THE INVENTION

Advanced hot-gas control systems are being designed and tested with operating temperatures in excess of 3000° F. These operating temperatures preclude the use of many metals in the construction of the control systems. Refractory metals and their carbides, however, have very high melting points (e.g. TiC @ 3140° C., NbC @ 3500° C., ZrC @ 3540° C., TaC @ 3880° C., HfC @ 3890° C. and the mixed phase $Ta_4HfC_5$ @ 4215° C.), and could therefore be used in structural applications at temperatures in excess of 2000° C. (3632° F.). Moreover, refractory carbides exhibit unusually high oxidation resistance and can therefore be used in structural applications to temperatures exceeding that of refractory metals such as Re. Refractory carbides are also significantly lighter than refractory metals, with densities around 5-12 g/ccm (by way of comparison, Re, Ir and W have densities around 19-22 g/ccm).

Refractory metal and refractory metal carbide components are, however, difficult to produce using metallurgical processes such as casting, forming, machining, and joining. Because of these metals' high melting points, casting may be impractical, and therefore powder metallurgy is the primary process for producing refractory metal plates or barstock. This process is labor intensive, expensive, and has a long lead time, as components made via powder metallurgy must go through multiple processing steps and heat treatments, followed by costly and laborious machining processes that require special equipment.

SUMMARY OF THE INVENTION

The present invention solves the foregoing problems by providing a method for producing refractory metal and refractory metal carbide coatings and components from refractory metal and/or refractory metal carbide nanoparticles. Such nanoparticles can be used in many applications, including, for example, in the low-temperature formation of fully dense parts. In this regard, a refractory metal or refractory metal carbide nanoparticle mixture can be disposed in a mold and sintered to form fully-dense refractory metal or refractory metal carbide components with enhanced microstructures (e.g., providing high fracture toughness and enhanced ductility). The nanoparticles enjoy a wide range of uses, beyond fully dense part fabrication. For example, a refractory metal or refractory metal carbide nanoparticle mixture can be painted onto a surface to be coated and heated to form a gas-tight coating. The low temperature formation of refractory metal and refractory metal carbide coatings allows these coatings to be provided on surfaces that would otherwise be uncoatable, whether because of the temperature required to perform hot isostatic pressing ("HIP") on a coating or because of the high aspect ratio of the surface (e.g., which would prevent chemical vapor deposition from being effective). The nanoparticles may be formed by reacting refractory metal precursors in the presence of various surfactants that can limit the growth of the nanoparticles to particular sizes or ranges of sizes.

According to one embodiment of the present invention, a method for manufacturing refractory metal nanoparticles comprises the steps of providing a solvent, providing a refractory metal precursor including a refractory metal and one or more additional elements, providing a reactant for reacting with the refractory metal precursor to free the refractory metal from the one or more additional elements, providing a surfactant, and combining the refractory metal precursor, the reactant and the surfactant in the solvent to form a plurality of refractory metal nanoparticles and to surround each refractory metal nanoparticle with a layer of molecules of the surfactant.

According to another embodiment of the present invention, a method for forming a refractory metal coating comprises the steps of providing a refractory metal nanoparticle mixture including a solvent and a plurality of refractory metal nanoparticles, each of the plurality of refractory metal nanoparticles being surrounded by a layer of surfactant molecules, disposing the refractory metal nanoparticle mixture on a surface to be coated, heating the refractory metal nanoparticle mixture to a first temperature to evaporate the solvent and leave the plurality of refractory metal nanoparticles surrounded by surfactant molecules on the surface, heating the refractory metal nanoparticles and the surfactant molecules to a second temperature to remove the surfactant molecules and leave the plurality of refractory metal nanoparticles on the surface, and heating the refractory metal nanoparticles to a third temperature to bond the refractory metal nanoparticles to form a coating on the surface.

According to yet another embodiment of the present invention, a method for forming a refractory metal carbide coating comprises the steps of providing a refractory metal nanoparticle mixture including a solvent and a plurality of refractory metal nanoparticles, each of the plurality of refractory metal nanoparticles being surrounded by a layer of surfactant molecules, disposing the refractory metal nanoparticle mixture on a surface to be coated, heating the refractory metal nanoparticle mixture to a first temperature to evaporate the solvent and leave the plurality of refractory metal nanoparticles surrounded by surfactant molecules on the surface, and heating the refractory metal nanoparticles and the surfactant molecules to a second temperature to decompose the surfactant molecules and to react the plurality of refractory metal nanoparticles with carbon from the decomposed surfactant to provide a refractory metal carbide coating on the surface.

According to yet another embodiment of the present invention, a method for manufacturing refractory metal carbide nanoparticles comprises the steps of providing a refractory metal alkyl precursor comprising a refractory metal and an alkyl group, and heating the refractory metal alkyl in the presence of a surfactant to decompose the refractory metal alkyl precursor into a refractory metal carbide nanoparticle surrounded by a layer of molecules of the surfactant.

According to yet another embodiment of the present invention, a method for forming a refractory metal carbide coating comprises the steps of providing a refractory metal carbide nanoparticle mixture including a solvent and a plurality of refractory metal carbide nanoparticles, each of the plurality of refractory metal carbide nanoparticles being surrounded by a layer of surfactant molecules, disposing the refractory metal carbide nanoparticle mixture on a surface to be coated, heating the refractory metal carbide nanoparticle mixture to a first temperature to evaporate the solvent and leave the plurality of refractory metal carbide nanoparticles surrounded by surfactant molecules on the surface, heating the refractory metal carbide nanoparticles and the surfactant molecules to a second temperature to remove the surfactant molecules and leave the plurality of refractory metal carbide nanoparticles on the surface, and heating the refractory metal carbide nanoparticles to a third temperature to bond.

According to yet another embodiment of the present invention, a method for forming a refractory metal component comprises the steps of providing a refractory metal nanoparticle mixture in a mold, the mixture including a solvent and a plurality of refractory metal nanoparticles, each of the plurality of refractory metal nanoparticles being surrounded by a layer of surfactant molecules, and sintering the refractory metal nanoparticle mixture to consolidate the refractory metal component.

According to yet another embodiment of the present invention, a method for forming a refractory metal carbide component comprises the steps of providing a refractory metal carbide nanoparticle mixture in a mold, the mixture including a solvent and a plurality of refractory metal carbide nanoparticles, each of the plurality of refractory metal carbide nanoparticles being surrounded by a layer of surfactant molecules, and sintering the refractory metal carbide nanoparticle mixture to consolidate the refractory metal carbide component.

According to yet another embodiment of the present invention, a method for forming a refractory metal carbide component comprises the steps of providing a refractory metal nanoparticle mixture including a solvent and a plurality of refractory metal nanoparticles, each of the plurality of refractory metal nanoparticles being surrounded by a layer of surfactant molecules, disposing the refractory metal nanoparticle mixture in a mold, heating the refractory metal nanoparticle mixture to a first temperature to evaporate the solvent and leave the plurality of refractory metal nanoparticles surrounded by surfactant molecules in the mold, and heating the refractory metal nanoparticles and the surfactant molecules to a second temperature to decompose the surfactant molecules and to react the plurality of refractory metal nanoparticles with carbon from the decomposed surfactant to provide a refractory metal carbide component.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

I. Refractory Metal Nanoparticles

Figure 1:
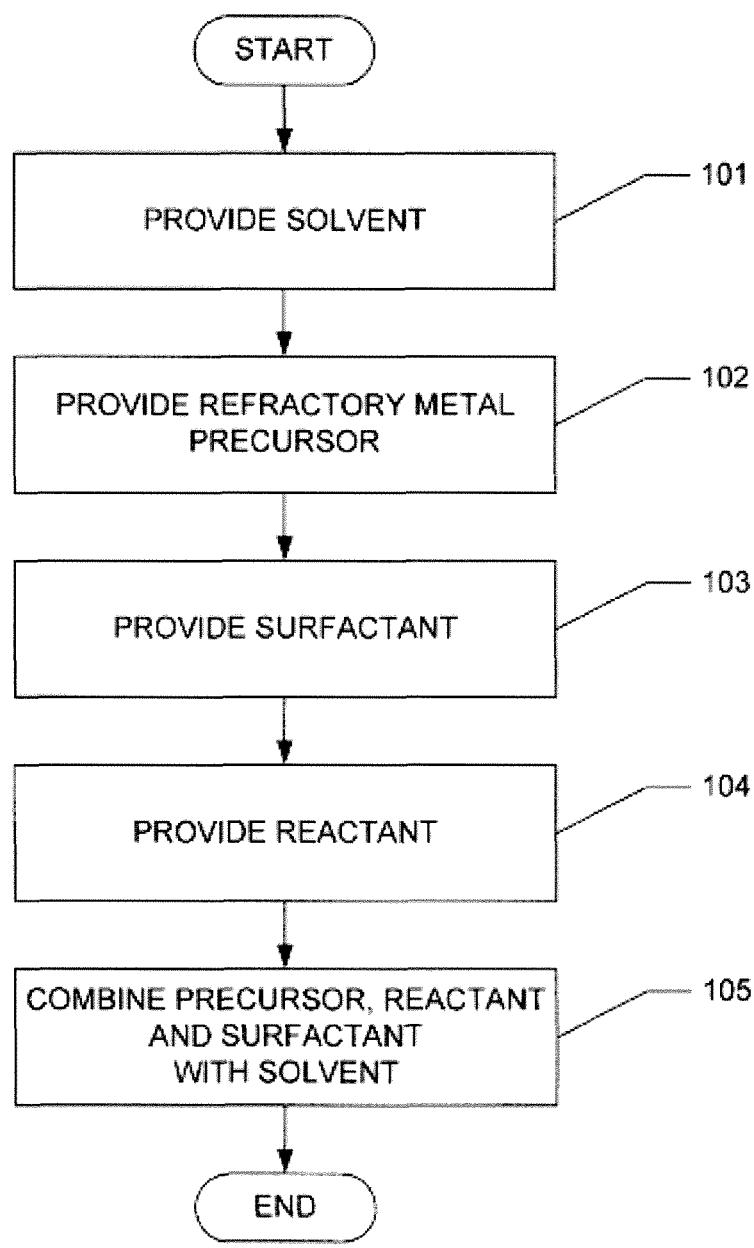
FIG. 1 is a flowchart illustrating a method for manufacturing refractory metal nanoparticles in accordance with one embodiment of the present invention.

FIG. 1 is a flowchart illustrating a method for manufacturing refractory metal or refractory metal nanoparticles in accordance with one embodiment of the present invention. In step 101, a solvent is provided. In accordance with one aspect of the present invention, the solvent may be a poly-ether solvent, such as, for example, a solvent characterized by the chemical formula R—O—($CH_2CH_2$—O)$_x$—R (where x is a positive integer, and R is a methyl group ($CH_3$), an ethyl group ($C_2H_5$), a propyl group ($C_3H_7$), or a butyl group ($C_4H_6$)). Alternatively, the solvent may be triglyme or tetrahydrofuran (THF). In step 102, a refractory metal precursor including a refractory metal of interest is provided. For example, in accordance with one embodiment of the present invention, the precursor may be a chloride of the desired refractory metal, such as $TiCl_4$. In step 103, a surfactant is provided. The surfactant may be an organic amine, phosphine, acid or the like. For example, in the present exemplary embodiment, the surfactant may be n-hexylamine ($CH_3(CH_2)_5NH_2$), n-nonylamine ($CH_3(CH_2)_8NH_2$), n-dodecylamine ($CH_3(CH_2)_{11}NH_2$), or any other amine characterized by the chemical formula $CH_3(CH_2)_xNH_2$, where x is a positive integer. In step 104, a reactant capable of reducing the refractory metal in the precursor to its atomic form is provided. For example, in the present exemplary embodiment, the reactant may be sodium naphthalene or lithium naphthalene, or any other reactant capable of reducing $TaCl_5$. In other embodiments in which other precursors are used, other reactants may be used. For example, in various other embodiments, the precursor may be any one of any refractory metal halide, fluoride, chloride, bromide, iodide, alcoxide or refractory metal complex with acetylacetonate ligands, and the reactant may be any one of Li, K, Na, Mg, or Ca may be dissolved in THF and/or glyme in the presence of a promoter such as naphthalene ($C_{10}H_8$), anthracene ($C_{14}H_{10}$) or phenanthrene ($C_{14}H_{10}$).

In step 105, the precursor, the reactant and the surfactant are combined in the poly-ether solvent to initiate a chemical reaction which forms nanoparticles of the refractory metal (e.g., titanium (Ti), zirconium (Zr), hafnium (Hf), niobium (Nb), tantalum (Ta), tungsten (W) or silicon (Si)), each of which is surrounded by a layer of molecules of the surfactant. For example, in the present exemplary embodiment, in which the precursor is $TiCl_4$, the reactant is sodium naphthalene, and the surfactant is n-hexylamine ($CH_3(CH_2)_5NH_2$), the reaction proceeds as follows. Initially, the reactant and the refractory metal precursor react to free elemental Ti from the precursor. The sodium chloride (NaCl) precipitates out of the solution, while the free atoms of $Ti_{metal}$ rapidly coalesce to form Ti nanoparticles. The free electrons in the $NH_2$ end of the n-hexylamine ($CH_3(CH_2)_5NH_2$) surfactant molecules in the solvent are drawn to and form bonds with the dangling bonds (i.e., the unsaturated bonding orbitals) of the outermost Ti atoms in the rapidly growing Ti nanoparticles, such that the surfactant molecules form a protective barrier around the nanoparticles which prevents their further growth. In this fashion, the reaction is halted before the Ti nanoparticles have had a chance to further coalesce into a larger mass. The promoter (e.g., naphthalene, anthracene, phenanthrene, etc.) does not take part in the reaction directly and can be reclaimed and recycled by vacuum sublimation, as illustrated in the generalized exemplary equations set forth below:

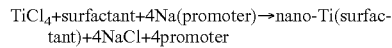

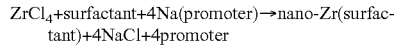

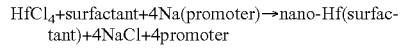

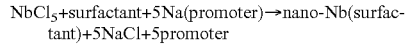

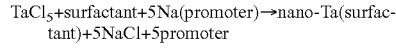

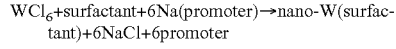

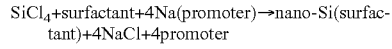

While the foregoing equations illustrate reactions with stoichiometric amounts of a promoter, the scope of the present invention is not limited to such an arrangement. Rather, the invention has application to embodiments in which far less of the promoter is present during the reaction (e.g., less than 10% of the stoichiometric amount may successfully be used).

According to one aspect of the present invention, the reactant may be an alkali or alkaline earth metal dissolved in an ether, optionally including a promoter such as naphthalene ($C_{10}H_8$), anthracene ($C_{14}H_{10}$) or phenanthrene ($C_{14}H_{10}$). For example, the reactant may be a sodium naphthalene mixture formed according to the following method. First, 2 g of Na (87 mmol) cut into small pieces for faster reaction (commercially available Na sand can be used as well) are added to a dry reaction container filled with an inert gas atmosphere containing 12 g of naphthalene (93.6 mmol). The reaction container is heated while the mixture is stirred, and the temperature is monitored via a thermocouple. The temperature should increase from room temperature to 130° C. in about 20 minutes. Naphthalene starts subliming around 120° C. and sometimes some of it will melt during this procedure. When 130° C. is reached, and after the naphthalene is sublimed, the mixture is chilled (e.g., with a dry ice/DI water bath) to 0° C., and 100 ml dry THF is added to the mixture. The mixture will almost immediately turn a very dark forest green color, indicating the successful formation of the sodium naphthalene complex. The reaction is kept cold by adding dry ice and water to the cooling bath in order to prevent the sodium complex from decomposing back into elemental sodium. After 1-2 hours, the sodium will have dissolved, depending on the size of the Na pieces added and how well the procedure has been carried out. It is important to have absolutely dry reaction containers and chemicals, since the sodium is in an extremely reactive state and will react immediately with any moisture or oxygen or any other reactive chemical present.

According to another aspect of the present invention, the reactant may be a lithium naphthalene mixture formed according to the following method. 0.7 g (101 mmol) of Li cut into small pieces for faster reaction are added to a dry reaction container filled with an inert gas atmosphere containing 12 g of naphthalene (93.6 mmol). The reaction container is heated while the mixture is stirred, and the temperature is monitored via a thermocouple. The temperature should increase from room temperature to 130° C. in about 20 minutes. Naphthalene starts subliming around 120° C. and sometimes some of it will melt during this procedure. When 130° C. is reached, and after the naphthalene is sublimed, the mixture is chilled (e.g., with a dry ice/DI water bath) to 0° C., and 100 ml dry THF is added to the mixture. The mixture will almost immediately turn a very dark forest green color, indicating the successful formation of the lithium naphthalene complex. The reaction is kept cold by adding dry ice and water to the cooling bath in order to prevent the lithium complex from decomposing back into elemental lithium. After 1-2 hours, the lithium will have dissolved, depending on the size of the Li pieces added and how well the procedure has been carried out. It is important to have absolutely dry reaction containers and chemicals, since the lithium is in an extremely reactive state and will react immediately with any moisture or oxygen or any other reactive chemical present.

According to another aspect of the present invention, the reactant may be a potassium naphthalene mixture formed according to the following method. 3.4 g (87 mmol) of K cut into small pieces for faster reaction are added to a dry reaction container filled with an inert gas atmosphere containing 12 g of naphthalene (93.6 mmol). The reaction container is heated while the mixture is stirred, and the temperature is monitored via a thermocouple. The temperature should increase from room temperature to 130° C. in about 20 minutes. Naphthalene starts subliming around 120° C. and sometimes some of it will melt during this procedure. When 130° C. is reached, and after the naphthalene is sublimed, the mixture is chilled (e.g., with a dry ice/DI water bath) to 0° C., and 100 ml dry THF is added to the mixture. The mixture will almost immediately turn a very dark forest green color, indicating the successful formation of the potassium naphthalene complex. The reaction is kept cold by adding dry ice and water to the cooling bath in order to prevent the potassium complex from decomposing back into elemental K. After 1-2 hours, the potassium will have dissolved, depending on the size of the K pieces added and how well the procedure has been carried out. It is important to have absolutely dry reaction containers and chemicals, since the potassium is in an extremely reactive state and will react immediately with any moisture or oxygen or any other reactive chemical present.

According to yet other aspects of the present invention, the reactant may be a mixture of any one of lithium, potassium, sodium, magnesium or calcium, together with naphthalene, anthracene or phenanthrene.

According to one aspect of the present invention, the order in which the reagents are combined is important for ensuring a narrow size distribution of refractory metal nanoparticles. For example, when both the surfactant and the precursor are added to the solvent (and thoroughly distributed therein) before the reactant is added thereto, local differences in the concentration of the refractory metal precursor and the surfactant can be avoided. This equilibrium ensures that when the reactant is added, the refractory metal nanoparticles that form will form in a similar manner and achieve similar sizes.

Moreover, the speed with which the reactant is added to the reaction is important for ensuring a narrow size distribution of refractory metal nanoparticles, in accordance with one embodiment of the present invention. By slowly adding the reactant (e.g., at a rate of about 50 to 60 drops per minute), local differences in the concentration of the reactant can similarly be avoided, to ensure that the refractory metal nanoparticles form in near-equilibrium conditions and achieve similar final sizes. Alternatively, by more quickly adding the reactant (e.g., at a rate greater than 100 drops per minute), a larger particle size distribution can be achieved (e.g., due to the local concentration differences that occur). In accordance with one embodiment of the present invention, reactant can be slowly added until nearly all of the precursor has been consumed, at which time a surplus of reactant (i.e., more than is needed to react with all of the refractory metal precursor) is quickly added to ensure that all the remaining precursor is reacted with. This approach offers the advantage of ensuring that nearly all of the nanoparticles will achieve a similar size, while also ensuring that all of the precursor is consumed.

While in the foregoing exemplary embodiment, the surfactant used to prevent further nanoparticle growth is n-hexylamine, the scope of the present invention is not limited to this arrangement. Rather, as will be apparent to one of skill in the art, any one of a number of polar surfactant molecules with free electrons or electron pairs may be used as a surfactant with refractory metal nanoparticles. Moreover, while in the foregoing exemplary embodiment, only one surfactant was used, the present invention has application to reactions in which multiple surfactants are used to control the growth of nanoparticles. For example, the surfactant(s) used may be any one or more surfactants chosen from the illustrative list in Table 1, below:

TABLE 1

| Surfactant Type | Representative List |
|---|---|
| Organic amine (mono-, di- and tri-) | Pyridine |
| | Triethanol amine |
| | Diethylene triamine |
| | Ethylene diamine (C2 to C16) |
| | Hexyl-, nonyl-, Dodecyl amine (C6 to C16) |
| Organic amine halide salt (mono-, di-, tri- and tetra-) | Hexyl- nonyl-, Hexadecyl ammonium chloride (C6 to C16) |
| | Hexyl- nonyl-, Hexadecyl ammonium boride (C6 to C16) |
| Organic alcohol | Octanol, decanol, dodecanol (C6 to C16) |
| Organic acid | C2 to C16: Acetic acid, Hexanoic acid |
| | Oleic acid (cis-9-octadecenoic acid) |
| Organic phosphines/ phospine oxides | Tri-phenyl phosphine |
| | Tri-ethyl phosphine oxide |
| | C1 to C10 |
| Organic nitrile | Acetonitrile |
| | Benzonitrile |
| | C2 to C16 |

For example, in one embodiment of the present invention, a mixture of an organic phosphine/phosphine oxide, an organic amine, and an organic amine halide salt may be used to provide improved particle size control for a particular reaction (as one surfactant may be preferentially coordinating to the metal precursor, while another surfactant may preferentially coordinate with the elemental metal, and yet a third surfactant may preferentially coordinate with the nanoparticle).

In accordance with one aspect of the present invention, as some strong reducing agents (e.g., Li, K, Na, Mg, Ca, etc.) can and do react with organic nitriles, they should therefore not be used during the initial nanoparticle formation, but these can later be exchanged for, e.g., saturated amines.

In accordance with one important aspect of the present invention, the length of the carbon chains and number thereof on the surfactant molecule play an important role in determining the amount of protection given the nanoparticle. For straight, single hydrocarbon chain systems, chains shorter than C6 do not bond sufficiently with the nanoparticle to protect it, as little thermal energy is required to cause these molecules to come off. For chains longer than C16, the surfactant material is increasingly difficult to remove, which will make forming refractory metal coatings increasingly difficult, as is described in greater detail below. In general, amines bond more strongly to refractory metal nanoparticles than do alcohols, as the former exhibit higher Lewis Base strength, due to their ability to establish a higher covalent bond character.

While the foregoing exemplary embodiment has been described with reference to $TiCl_4$ reacting with sodium naphthalene, the scope of the present invention is not limited to this particular precursor and these particular reactants. Rather, the present invention has application to reactions for forming refractory nanoparticles which utilize any refractory metal precursor and any reactant capable of freeing elemental refractory metals from their precursors.

According to another embodiment of the present invention, two or more refractory metal precursors may be reacted in a single reaction, to provide mixed metal systems and alloys. For example, by reacting a metal precursor and a silicon precursor, metal silicides may be formed. In addition, it is possible to produce mixtures that do not form alloys or compositions that do not like to mix in a particular ratio, producing thereby a two phase system with nano-scale distribution, for use in solar cell systems or nano-scale ceramic glass-like metal systems.

Figure 2:
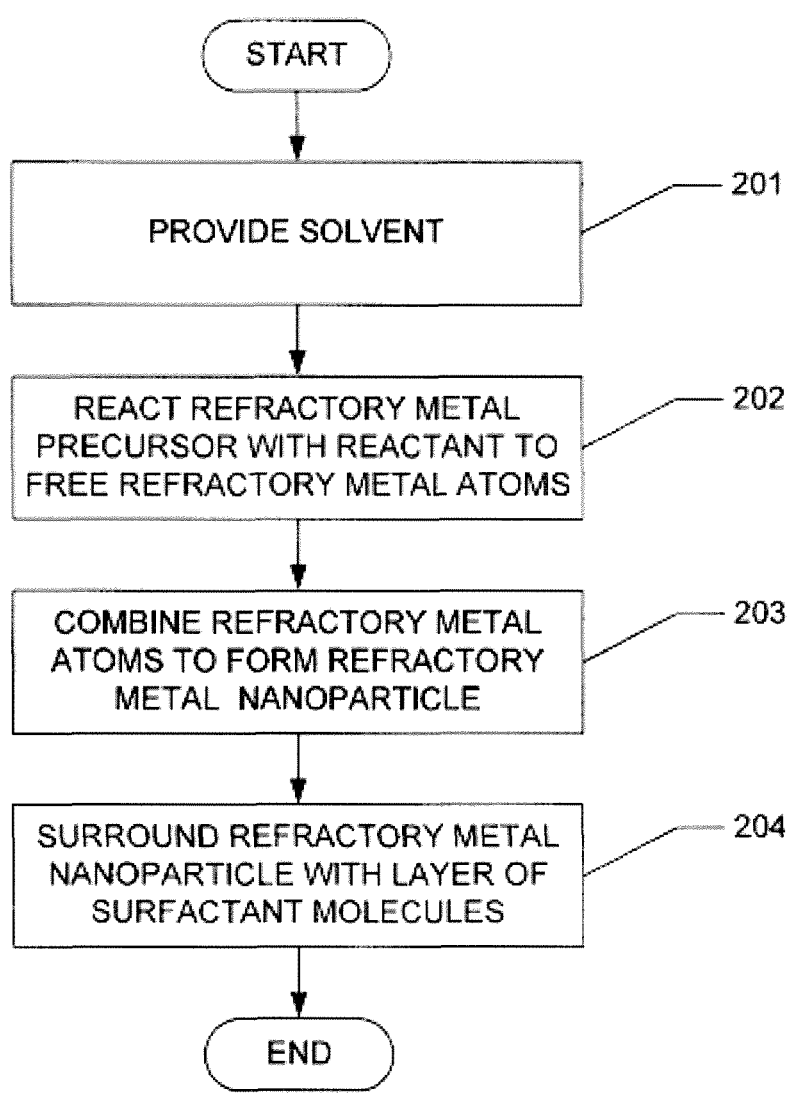
FIG. 2 is a flowchart illustrating a method for manufacturing refractory metal nanoparticles in accordance with one embodiment of the present invention.

FIG. 2 is a flowchart illustrating a method for manufacturing refractory metal nanoparticles in accordance with another embodiment of the present invention. In step 201, a poly-ether solvent, such as monoglyme $CH_3$—O—$CH_2CH_2$—O—$CH_3$, diglyme $CH_3$—O—$(CH_2CH_2$—O$)_2$—$CH_3$, triglyme $CH_3$—O—$(CH_2CH_2$—O$)_3$—$CH_3$, or any other glyme characterized by the chemical formula R—O—$(CH_2CH_2$—O$)_x$—R, where x is a positive integer and R is a methyl group ($CH_3$), an ethyl group ($C_2H_5$), a propyl group ($C_3H_7$), or a butyl group ($C_4H_6$), is provided. In step 202, a refractory metal precursor and a reactant are reacted in the poly-ether solvent to free refractory metal atoms from the precursor. The byproducts of this reaction are precipitated out of solution or boiled off. In step 203, the refractory metal particles are combined in the poly-ether solvent to form a refractory metal nanoparticle. In step 204, the refractory metal nanoparticle is surrounded, in the poly-ether solvent, with a layer of surfactant molecules. The surfactant molecules, which are provided in the solvent at the beginning of the reaction, may be one or more of n-hexylamine ($CH_3(CH_2)_5NH_2$), n-nonylamine ($CH_3(CH_2)_8NH_2$), n-dodecylamine ($CH_3(CH_2)_{11}NH_2$), or any other amine or mixture of amines characterized by the chemical formula $CH_3(CH_2)_xNH_2$, where x is a positive integer.

Figure 3:
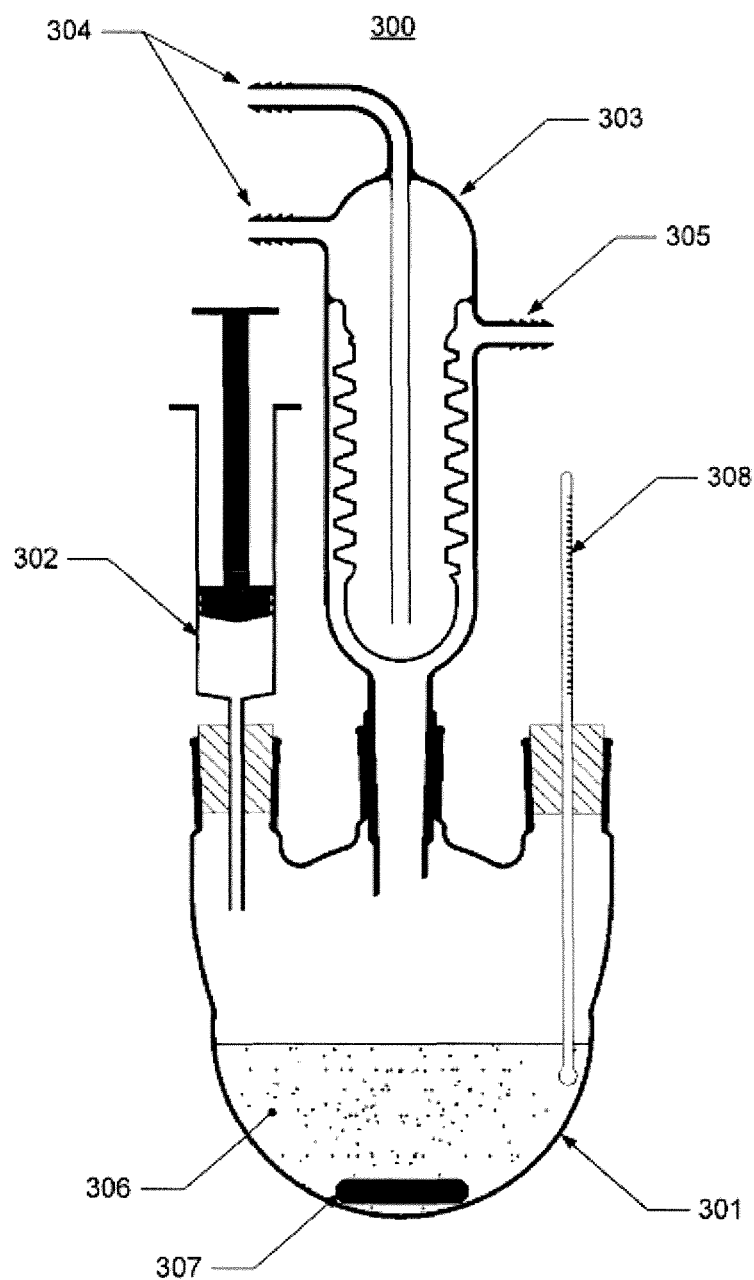
FIG. 3 illustrates a reactor used in the manufacture of refractory metal or refractory metal carbide nanoparticles in accordance with one embodiment of the present invention.

Turning to FIG. 3, a reactor system used in the manufacture of refractory metal nanoparticles is illustrated in accordance with one embodiment of the present invention. Reactor system 300 includes a continuous stirred-tank reactor 301, into which reagents 306 are provided via a syringe or an addition funnel 302. An impeller 307 stirs the reagents 306 to ensure thorough mixing thereof (e.g., to optimize the particle size distribution of the refractory metal nanoparticles). A condenser 303 allows gases created in the chemical reactions occurring in reactor 301 (e.g., hydrogen in the present exemplary embodiment) to escape through outlet 305, while coolant which flows through ports 304 through condenser 303 cools more volatile species (such as the surfactant or the solvent) and allows them to trickle back down along the corkscrew-shaped path in condenser 303 into reactor 301. A thermometer 308 is used to track the temperature of the reagents 306 during the chemical reaction. System 300 may further include a heat source (not illustrated) to increase the temperature of the reaction, and thereby control the size and size distribution of the refractory metal nanoparticles, as described in greater detail below.

According to one aspect of the present invention, reactor 301 can be heated (or cooled) to control the temperature at which the reactions therein take place. The duration for which heat is applied provides a mechanism for ensuring even distribution of the reagents during the reaction and thorough mixing thereof, so that the size distribution of the refractory metal nanoparticles can be narrowed. For example, in accordance with one aspect of the present invention, reactor 301 is heated for about 90 minutes after combining the solvent, refractory metal precursor and surfactant therein to ensure an even distribution thereof.

According to another aspect of the present invention, the concentration of surfactant in the reaction can similarly modify the resultant size and size distribution of refractory metal nanoparticles. With higher concentrations of surfactant, the refractory metal nanoparticles are more likely to encounter and bond with surfactant molecules early in their growth, resulting in both smaller nanoparticles, and a smaller distribution of particle sizes.

While in the foregoing exemplary embodiments, the refractory metal nanoparticles have been described with respect to particular sizes, the scope of the present invention is not limited to these particular arrangements. For example, by reducing the concentration of surfactant in the reaction or increasing the speed with which the reactant is added thereto, refractory metal nanoparticles larger than 100 nm may be manufactured. Alternatively, by increasing the concentration of surfactant in the reaction, nanoparticles as small as 4 nm nay be manufactured. As will be apparent to one of skill in the art, the present invention has application to the manufacture of refractory metal nanoparticles of nearly any size.

In accordance with one exemplary experimental embodiment of the present invention, a mixture including 4.1 g (20 mmol) of $TiCl_4$, 20 ml of either THF or triglyme and 80 mmol of dodecyl amine is provided. To this mixture, one of the above mixtures containing solubilized alkaline or alkaline earth metal with a four-fold excess is slowly added via an addition funnel, to produce four equivalents of NaCl and titanium nanoparticles, which appear as black powder. For the success of the reaction, it is important to have dry reaction containers and chemicals, or an oxide will be formed in lieu of the metal nanoparticles. The Ti particle size is controlled by both the amount of the amine surfactant in the mixture and the temperature at which the reaction with the reagent is carried out. With these particular reagents, the reaction commences very rapidly and can be carried out at room temperature (e.g., about 20° C.).

In accordance with another exemplary experimental embodiment of the present invention, a mixture including 5.75 g (14.5 mmol) of $WCl_6$, 50 ml of either THF or triglyme and 80 mmol of dodecyl amine is provided. To this mixture, one of the above mixtures containing solubilized alkaline or alkaline earth metal with a four-fold excess is slowly added via an addition funnel, to produce four equivalents of NaCl and tungsten nanoparticles (black powder). For the success of the reaction, it is important to have dry reaction containers and chemicals, or an oxide will be formed in lieu of the metal nanoparticles. The W particle size is controlled by both the amount of the amine surfactant in the mixture and the temperature at which the reaction with the reagent is carried out. With these particular reagents, the reaction commences very rapidly and can be carried out at room temperature (e.g., about 20° C.).

In accordance with yet another exemplary experimental embodiment of the present invention, a mixture including 4.1 g (20 mmol) of $SiCl_4$, with 20 ml of either THF or triglyme and 80 mmol of dodecyl amine is provided. To this mixture, one of the above mixtures containing solubilized alkaline or alkaline earth metal with a four-fold excess is slowly added via addition funnel, to produce four equivalents of NaCl and silicon nanoparticles (black powder). The Si particle size is controlled by both the amount of the amine surfactant in the mixture and the temperature at which the reaction with the reagent is carried out. With these particular reagents, the reaction commences very rapidly and can be carried out at room temperature (e.g., about 20° C.).

Figure 4:
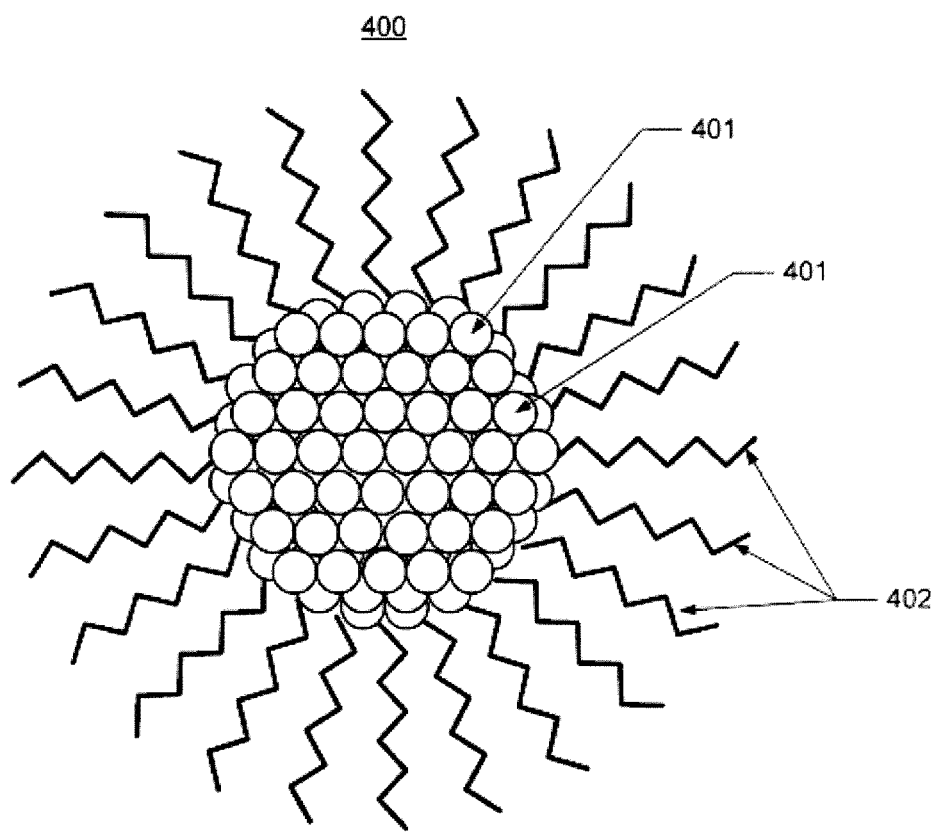
FIG. 4 illustrates a nanoparticle surrounded with surfactant molecules in accordance with one embodiment of the present invention.

FIG. 4 illustrates a single refractory metal nanoparticle in greater detail, in accordance with one embodiment of the present invention. Refractory metal nanoparticle 400 includes a plurality of refractory metal atoms 401 tightly bonded together. Surrounding atoms 401 is a layer of surfactant molecules 402, in this case, n-hexylamine ($CH_3(CH_2)_5NH_2$). The $NH_2$ end of each n-hexylamine molecule has bonded with the dangling bonds (i.e., the unsaturated bonding orbitals) of the outermost refractory metal atoms 401 in refractory metal nanoparticle 400 to form a protective barrier around nanoparticle 400. While FIG. 4 illustrates a single particle in cross-section, showing only a ring of surfactant molecules at the periphery of the nanoparticle, an actual nanoparticle has a three-dimensional shell of surfactant molecules 402 surrounding the refractory metal atoms 401 on all sides.

In accordance with one aspect of the present invention, surfactant molecules 402 need not be the same surfactant molecules used to stop refractory metal nanoparticle 400 from growing during the manufacture thereof. Rather, as will be immediately understood by one of skill in the art, a simple ligand exchange may be used to replace some or all of the surfactant molecules which were used in the manufacture of refractory metal nanoparticle 400.

Figure 5:
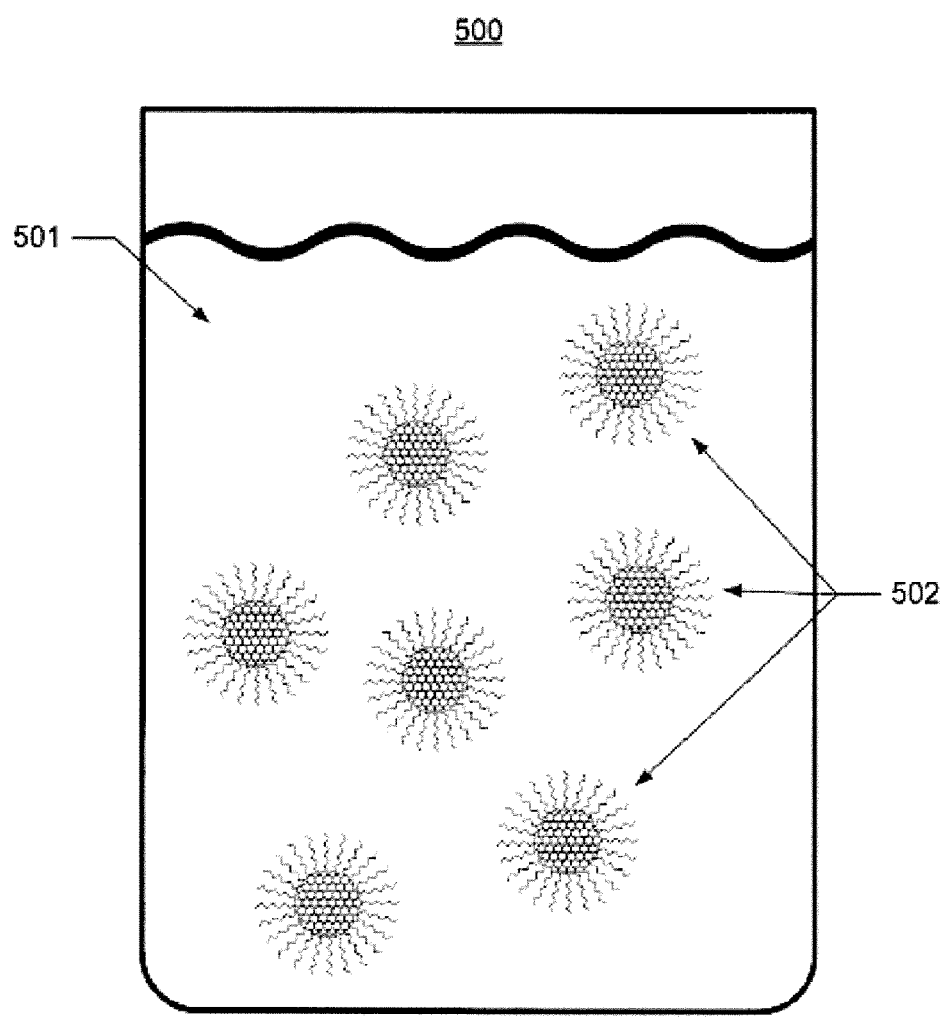
FIG. 5 illustrates a refractory metal nanoparticle mixture in accordance with one embodiment of the present invention.

FIG. 5 illustrates a refractory metal nanoparticle mixture in accordance with one embodiment of the present invention. Nanoparticle mixture 500 includes a solvent 501, in which are disposed a plurality of refractory metal nanoparticles 502. The solvent 501 need not be the same poly-ether solvent used in the manufacturing process of refractory metal nanoparticles 502. Rather, different solvents may be used in nanoparticle mixture 500 depending upon whether nanoparticle mixture 500 is to be used to coat a surface, as described in greater detail below, or whether nanoparticle mixture 500 is being stored. For example, in the present exemplary embodiment of the present invention, solvent 501 is hexane $CH_3(CH_2)_4CH_3$, a solvent with a low boiling point (~69° C.), suitable for use in the refractory metal nanoparticle coating processes described in greater detail below. Each nanoparticle 502 is surrounded by a layer of surfactant molecules which form a protective barrier around the nanoparticle, preventing it from chemically reacting with other substances, such as air or moisture. This protective layer of surfactants around each nanoparticle 502 allows mixture 500 to be handled with relative safety (e.g., as the pyrophoricity of the nanoparticles may be negated thereby).

In accordance with various aspects of the present invention, depending upon their size, nanoparticles 502 may either be dissolved in solvent 501, or may alternately form a slurry therewith. For example, in hexane, nanoparticles smaller than 10 nm will dissolve, while those larger than about 10 nm will not. Alternatively, in solvents such as xylene or toluene, larger nanoparticles will still be soluble. According to an additional aspect of the present invention, when the size distribution of nanoparticles 502 is large enough (or if more than one narrow size range of nanoparticles is present), some nanoparticles may be dissolved in the solvent, while others form a slurry therewith.

The ability of some solvents to dissolve smaller nanoparticles than others can be exploited to separate nanoparticles of different sizes, in accordance with one embodiment of the present invention. For example, by introducing the nanoparticles into a hexane solvent, nanoparticles larger than 10 nm (i.e., those that do not dissolve in hexane) can be separated from nanoparticles smaller than 10 nm (i.e., those that do dissolve in hexane). These larger particles can then be introduced into a different solvent, such as xylene or toluene, to again separate smaller and larger particles (depending upon their solubility in this solvent). A third fraction of the nanoparticles can similarly be separated out by size in yet another solvent such as isopropyl alcohol ("IPA"). Nanoparticles (and agglomerates thereof) which are larger than about 100 nm will not dissolve well in any known organic solvent with low polarity.

In accordance with one aspect of the present invention, refractory metal nanoparticle mixture 500 may include refractory metal nanoparticles 502 of a variety of sizes and of different compositions. For example, nanoparticles 502 may have a single, continuous particle size distribution, as a result of all the nanoparticles being created in a single reaction. Alternatively, nanoparticles 502 may have multiple non-continuous particle size distributions (e.g., as a result of mixing nanoparticles produced in separate reactions, or of separate compositions), where some of the nanoparticles are smaller (e.g. between 4 nm and 10 nm), and the remainder of the particles are larger (e.g., between 25 nm and 100 nm). This arrangement may be particularly desirable for increasing the volumetric packing efficiency of nanoparticles in a refractory metal coating, as discussed in greater detail below. It will be immediately apparent to one of skill in the art that the foregoing embodiments are merely exemplary, and that the present invention has application to refractory metal nanoparticle mixtures with any size refractory metal nanoparticles of any composition and with any particle size distribution.

II. Refractory Metal Carbide Nanoparticles

Figure 6:
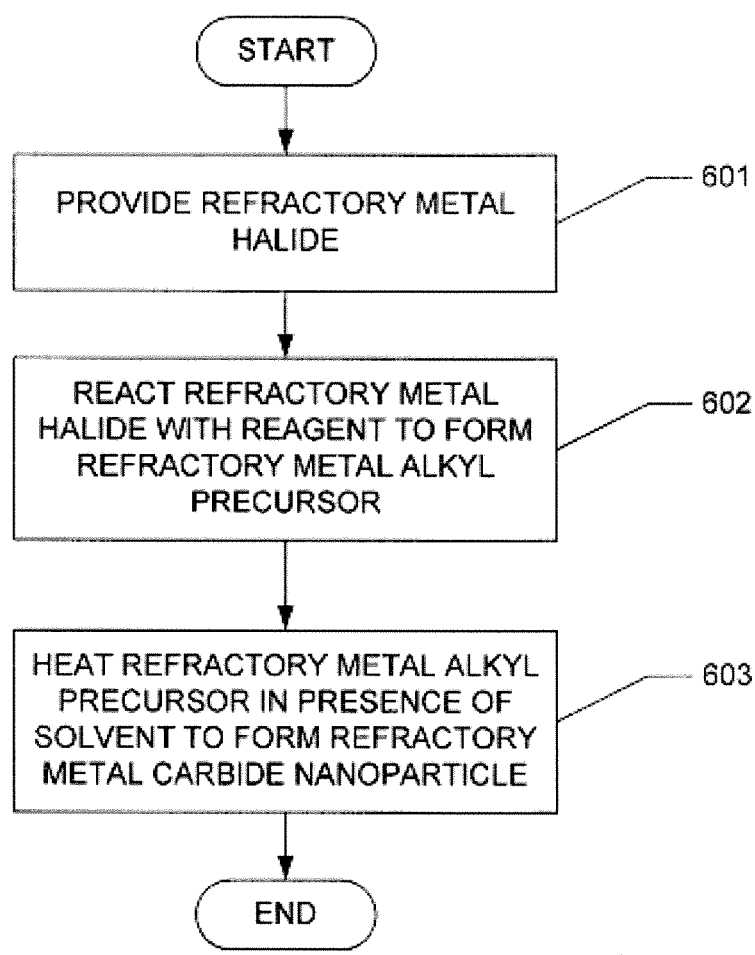
FIG. 6 is a flowchart illustrating a method for manufacturing refractory metal nanoparticles in accordance with one embodiment of the present invention.

FIG. 6 is a flow chart illustrating an exemplary method by which refractory metal carbide nanoparticles may be manufactured in accordance with one embodiment of the present invention. The method begins with step 601, in which a refractory metal halide is provided. In step 602, the refractory metal halide is treated with a reagent to provide a refractory metal alkyl precursor, such as, for example, $Ti(CH_3)_4$. According to various aspects of the present invention, the reagent may be a Grignard reagent (e.g., an alkyl- or aryl-magnesium halides) or a lithium organic reagent. All three are readily available or easily prepared for a wide variety of alkyl groups, and have the additional advantage that Li and Mg are highly electropositive and thus usually cause the equilibrium of the reaction to lie to the right. When a lithium organic reagent is used, such as $LiCH_3$, for example, the resultant lithium chloride precipitates and helps to force the reaction to the right. Moreover, such lithium organic reagents are readily available for many compounds and are easily synthesized from an organic halide (e.g. $ICH_3$) and lithium metal. Some exemplary equations representing the treatment of step 602 are set forth below, for the provision of titanium, zirconium, and tungsten alkyl precursors:

$$TiCl_4 + 4LiCH_3 \rightarrow Ti(CH_3)_4 + 4LiCl \text{(preferably conducted below } -40° \text{ C.)}$$

$$ZrCl_4 + 4LiCH_3 \rightarrow Zr(CH_3)_4 + 4LiCl \text{(preferably conducted below } -15° \text{ C.)}$$

$$WCl_6 + 6LiCH_3 \rightarrow W(CH_3)_6 + 6LiCl \text{(m.p. 30° C.)}$$

The refractory metal alkyl precursor thus formed includes the refractory metal and one or more alkyl groups. In step 603, the refractory metal alkyl is heated in the presence of a surfactant, in order to decompose the refractory metal alkyl precursor into a refractory metal carbide nanoparticle surrounded by a layer of molecules of the surfactant. An exemplary equation representing the heating of a titanium alkyl precursor is set forth below:

$$Ti(CH_3)_4 + \text{heat} \rightarrow TiC + 3CH_4$$

According to one aspect, the "heat" in the above equation may be more than about −40° C. This low temperature allows for good particle size control, due to the reduced kinetic activity at that temperature.

According to another aspect of the present invention, metalorganic compounds that allow for β-elimination may not be desirable, as these can lead to the formation of metal hydrides and pure metals, rather than the desired carbide, and/or may provide undesired sub-stoichiometric carbon content. For example, $Ti(C_2H_5)_4$ may not be a desirable precursor, as this precursor would be impracticably difficult to decompose into a carbide, due to the O-elimination mechanism and its low stability (e.g., requiring temperatures below −80° C.):

$$Ti(C_2H_5)_4 + heat \rightarrow Ti + 4C_2H_4 + 2H_2$$

In some instances, the decomposition may not proceed as cleanly as desired, resulting in only a refractory metal carbide, but rather may produce a nonstoichiometric product mixture, thereby preventing the desired control. This is dependent upon the refractory metal alkyl precursor chosen, as will be readily apparent to those of skill in the art. For example, $Al(C_3H_7)_3$ may be used effectively for aluminum chemical vapor deposition for microelectronics applications.

In a similar manner to that described above with reference to the manufacture of refractory metal nanoparticles, the heating of a refractory metal alkyl precursor should occur in the presence of a surfactant in order to halt the growth of the refractory metal carbide nanoparticles at a desired size or size range. Similar surfactants and/or surfactant mixtures to those described above (e.g., in Table 1) may be used, in accordance with various aspects of the present invention.

According to another embodiment of the present invention, the forming metal nanoparticles can be "capped" with various organic groups (e.g., one or more methyls, ethyls, butyls, etc.) by using an otherwise insufficient amount of reducing agent, thereby leaving reactive halide groups on the nanoparticles' surfaces. The reagents used may include a Grignard reagent (e.g., an alkyl- or aryl-magnesium halide) or a lithium organic reagent. Both are readily available or easily prepared for a wide variety of alkyl groups, and have the additional advantage that Li and Mg are highly electropositve and thus usually cause the equilibrium of the reaction to lie to the right. When a lithium organic reagent is used, such as $LiCH_3$, for example, the resultant lithium chloride precipitates and helps to force the reaction to the right. Moreover, such lithium organic reagents are readily available for many compounds and are easily synthesized from an organic halide (e.g. $ICH_3$) and lithium metal. Some exemplary equations representing the treatment are set forth below:

$$_{nano}Hf_{2000}Cl_{100} + 100 LiCH_3 \rightarrow _{nano}Hf_{2000}(CH_3)_{100} + 100 LiCl \text{(conduct below } -15° \text{ C. because of thermal instability)}$$

$$_{nano}Ta_{2000}Cl_{100} + 100 LiCH_3 \rightarrow _{nano}Ta_{2000}(CH_3)_{100} + 100 LiCl \text{(conduct below } 0° \text{ C. because of thermal instability)}$$

$$_{nano}W_{2000}Cl_{100} + 100 LiCH_3 \rightarrow _{nano}W_{2000}(CH_3)_{100} + 100 LiCl \text{(room temperature stable)}$$

The advantage of this pathway is that the organic groups lend very good oxidation protection and stop particle growth, since they bond covalently to the nanoparticle surface and therefore particularly suited for the very reactive metals such as Zr, Hf, Nb, Ta, W, and Si. Only at elevated temperature would the organic groups start to oxidize and burn off.

According to another aspect of the present invention, these capped nanoparticles can be thermally decomposed directly into nanostructured carbide coatings or solid parts via moderate heating. Some exemplary equations representing the treatment are set forth below:

$$_{nano}Hf_{2000}(CH_3)_{100}(\text{surf}) + heat \rightarrow _{nano}HfC + H_2 + \text{volatiles}$$

$$_{nano}Ta_{2000}(CH_3)_{100}(\text{surf}) + heat \rightarrow _{nano}TaC + H_2 + \text{volatiles}$$

$$_{nano}W_{2000}(CH_3)_{100}(\text{surf} + heat \rightarrow _{nano}WC + H_2 + \text{volatiles}$$

According to one aspect of the present invention, the concentration of surfactant in the reaction can modify the resultant size and size distribution of refractory metal carbide nanoparticles. With higher concentrations of surfactant, the refractory metal carbide nanoparticles are more likely to encounter and bond with surfactant molecules early in their growth, resulting in both smaller nanoparticles, and a smaller distribution of particle sizes.

In accordance with one aspect of the present invention, a refractory metal carbide nanoparticle may be surrounded by surfactant molecules different from those used to stop the refractory metal carbide nanoparticle from growing during the manufacture thereof, via a simple ligand exchange.

In accordance with another aspect of the present invention, a refractory metal carbide nanoparticle mixture may be provided, in which a plurality of refractory metal carbide nanoparticles are disposed in a solvent. Different solvents may be used in the nanoparticle mixture, depending upon whether nanoparticle mixture is to be used to coat a surface, as described in greater detail below, or whether the nanoparticle mixture is being stored. For example, in one exemplary embodiment of the present invention, a solvent with a low boiling point such as hexane (~69° C.) may be used in the refractory metal carbide nanoparticle coating processes described in greater detail below.

In accordance with various aspects of the present invention, depending upon their size, the nanoparticles may either be dissolved in a solvent, or may alternately foam a slurry therewith. For example, in hexane, nanoparticles smaller than 10 nm will dissolve, while those larger than about 10 nm will not. Alternatively, in solvents such as xylene or toluene, larger nanoparticles will still be soluble. According to an additional aspect of the present invention, when the size distribution of nanoparticles is large enough (or if more than one narrow size range of nanoparticles is present), some nanoparticles may be dissolved in the solvent, while others form a slurry therewith.

The ability of some solvents to dissolve smaller nanoparticles than others can be exploited to separate nanoparticles of different sizes, in accordance with one embodiment of the present invention. For example, by introducing the nanoparticles into a hexane solvent, nanoparticles larger than 10 nm (i.e., those that do not dissolve in hexane) can be separated from nanoparticles smaller than 10 nm (i.e., those that do dissolve in hexane). These larger particles can then be introduced into a different solvent, such as xylene or toluene, to again separate smaller and larger particles (depending upon their solubility in this solvent). A third fraction of the nanoparticles can similarly be separated out by size in yet another solvent such as isopropyl alcohol ("IPA"). Nanoparticles (and agglomerates thereof) which are larger than about 100 nm will not dissolve well in any known organic solvent with low polarity.

In accordance with one aspect of the present invention, a refractory metal carbide nanoparticle mixture may include refractory metal carbide nanoparticles of a variety of sizes and of different compositions. Moreover, a mixture may include both refractory metal nanoparticles and refractory metal carbide nanoparticles. The nanoparticles may have a single, continuous particle size distribution, as a result of all the nanoparticles being created in a single reaction. Alternatively, the nanoparticles may have multiple non-continuous particle size distributions (e.g., as a result of mixing nanoparticles produced in separate reactions, or of separate compositions), where some of the nanoparticles are smaller (e.g. between 4 nm and 10 nm), and the remainder of the particles are larger (e.g., between 25 nm and 100 nm). This arrangement may be particularly desirable for increasing the volumetric packing efficiency of nanoparticles in a refractory metal carbide coating, as discussed in greater detail below. It will be immediately apparent to one of skill in the art that the foregoing embodiments are merely exemplary, and that the present invention has application to refractory metal carbide nanoparticle mixtures with any size refractory metal carbide nanoparticles of any composition and with any particle size distribution.

III. Nanoparticle Coatings

In accordance with one aspect of the present invention, a refractory metal or refractory metal carbide nanoparticle mixture can be "painted" onto surfaces to form thin coatings of refractory metals or refractory metal carbides. This is accomplished by disposing a refractory metal or a refractory metal carbide nanoparticle mixture onto a surface to be coated, and heating the "painted" mixture with progressively higher temperatures to (1) boil off the solvent, (2) boil off the surfactant and (3) "fuse" adjacent nanoparticles together. This process is described in greater detail below, with respect to FIG. 7.

Figure 7:
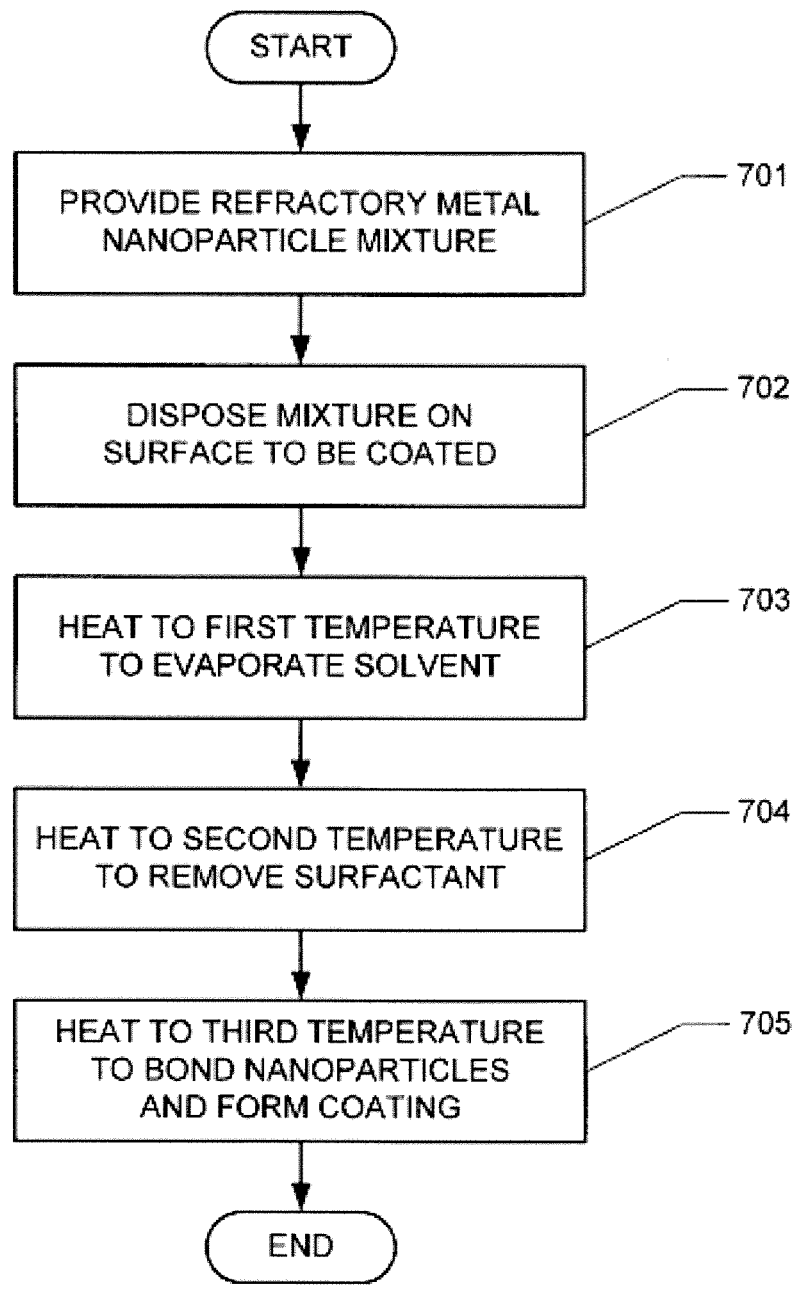
FIG. 7 is a flowchart illustrating a method for forming a refractory metal or refractory metal carbide coating in accordance with one embodiment of the present invention.

FIG. 7 is a flowchart illustrating a method for forming a refractory metal or refractory metal carbide coating in accordance with one embodiment of the present invention. The method begins with step 701, in which a refractory metal or refractory metal carbide nanoparticle mixture is provided. The nanoparticle mixture includes a solvent and a plurality of refractory metal or refractory metal carbide nanoparticles, each surrounded by a layer of surfactant molecules. In step 702, the nanoparticle mixture is disposed on a surface to be coated. In accordance with one important aspect of the present invention, the coating process does not require the surface to be coated to withstand the very high temperatures associated with most metallurgical approaches to coating a surface with refractory metals or their carbides (although many coated surfaces will have application in high-temperature environments, and accordingly may be capable of withstanding such temperatures). For example, the surface to be coated may be a carbon-based material, such as graphite or a carbon/carbon ("C/C") composite, which can withstand the low temperature coating process (e.g., which may occur at less than 20% of the bulk melting point of a carbide or refractory material used to coat it). In step 703, the coated surface is heated to a first temperature to evaporate the solvent from the nanoparticle mixture, leaving the coated refractory metal or refractory metal carbide nanoparticles arranged in a lattice on the surface. In the present exemplary embodiment, the first temperature is chosen to be a temperature sufficiently high to evaporate the solvent, but not high enough to evaporate the surfactant layer around in each molecule. For example, in an embodiment in which the solvent in the nanoparticle mixture is hexane, and in which the surfactant molecules are hexylamine molecules, the first temperature may be between 125° C. and 175° C.

Figure 8:
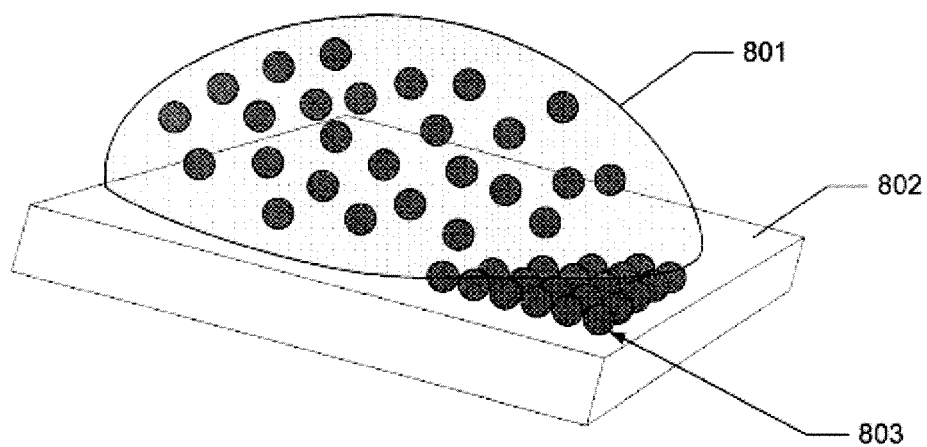
FIG. 8 illustrates the formation of a refractory metal or refractory metal carbide coating in accordance with one embodiment of the present invention.

Turning briefly to FIG. 8, the first heating step 703 is illustrated in greater detail in accordance with one embodiment of the present invention. In FIG. 8, the nanoparticle mixture 801, which has been disposed on surface 802, is beginning to evaporate, leaving refractory metal or refractory metal carbide nanoparticles 803 arranged on surface 802.

Returning to FIG. 7, the process continues with step 704, in which the coated surface is heated to a second temperature to remove the surfactant layers from around the nanoparticles. In accordance with the present exemplary embodiment of the invention, in which the surfactant is hexylamine, the second temperature is between about 130° C. and 150° C. In removing the surfactant molecules, this second heating step effects a volumetric contraction of the lattice of refractory metal or refractory metal carbide nanoparticles.

Depending upon the surfactant (or combination of surfactants) present in the nanoparticle mixture, the volume of the coated refractory metal or refractory metal carbide nanoparticles may be significantly larger than the uncoated nanoparticles left after second heating step 704. For example, in accordance with the present exemplary embodiment, in which the (single) surfactant used is hexylamine, the volume of the nanoparticles contracts by about 17% after the second heating step. Accordingly, in choosing a surfactant (or combination of surfactants) to use in preparing a nanoparticle mixture, those which provide a lesser volumetric contraction during this step may be desirable to reduce cracking of the resultant coating, in accordance with one aspect of the present invention. This contraction is illustrated in greater detail in FIGS. 9A and 9B, in accordance with one embodiment of the present invention.

Figure 9A:
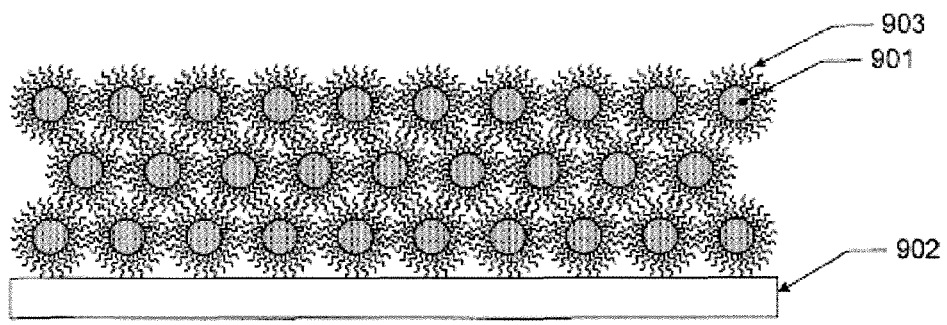
FIGS. 9A, 9B and 9C illustrate the formation of a refractory metal or refractory metal carbide coating in accordance with one embodiment of the present invention.
Figure 9B:
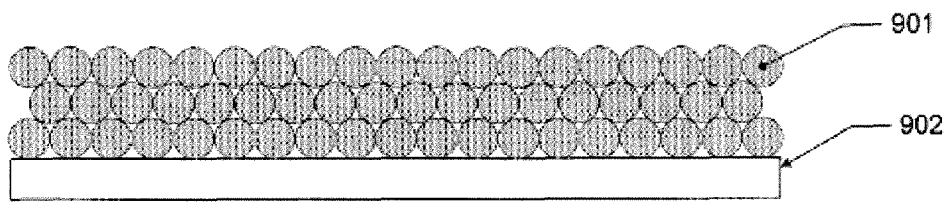

FIG. 9A illustrates an orderly lattice of surfactant-covered refractory metal or refractory metal carbide nanoparticles 901 disposed on a surface 902. As can be seen with reference to FIG. 9A, the surfactant molecules 903 space the cores of the nanoparticles a significant distance apart. Once these particles are heated to the second temperature of step 704, the surfactant molecules 903 are removed, and nanoparticles 901 contract in their absence, as illustrated in FIG. 9B. Depending upon the surfactant or surfactants used, this contraction may be significant enough to form cracks in the coating on surface 902. For example, the removal of longer surfactant molecules (e.g., with carbon chains longer than C16) may cause the refractory metal or refractory metal carbide nanoparticles to contract to such an extent, that the refractory metal or refractory metal carbide coating spalls and flakes off of surface 902.

While FIGS. 9A and 9B illustrate an embodiment of the present invention in which nanoparticles 901 are all approximately the same size (i.e., they have a very narrow particle size distribution), the scope of the present invention is not limited to such an arrangement. Rather, the present invention has application to nanoparticle coatings in which nanoparticles of different sizes and/or compositions are used to improve the packing efficiency thereof. For example, in accordance with one embodiment of the present invention, nanoparticles of two approximate sizes may be provided in a nanoparticle mixture, where the smaller nanoparticles are approximately 10% of the volume of the larger particles, to provide greater spherical packing efficiency (wherein the smaller particles occupy the interstitial spaces between the larger particles in the lattice). The smaller nanoparticles may have the same composition as the larger particles, or they may be a different composition (e.g., including a different refractory metal or refractory metal carbide). Other arrangements with different particle size distributions may also be provided, to further improve packing efficiency and crack resilience, within the scope of the present invention.

While in the foregoing exemplary embodiment, the evaporation of the solvent has been described as occurring prior to the removal of the surfactant, the scope of the present invention is not limited to such an arrangement. Rather, depending upon the surfactants and solvents used in the nanoparticle coating process, one or more surfactants may be removed prior to, or at the same time as, one or more of the surfactants used. Thus, in accordance with various embodiments of the present invention steps 703 and 704 may occur in any order, or may be combined in to a single step, in which the first and second temperature are one and the same.

Figure 9C:
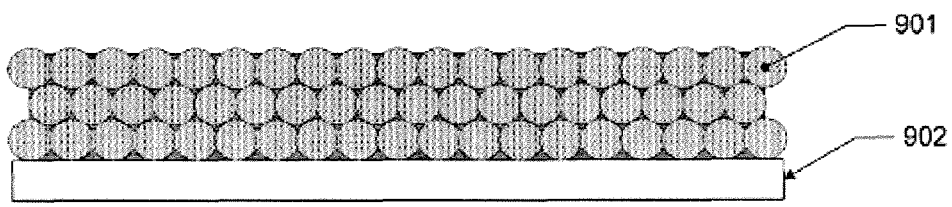

Returning to FIG. 7, the process continues with step 705, in which the coated surface is heated to a third temperature to bond the nanoparticles together to form a coating on the surface. In accordance with the present exemplary embodiment of the invention, the third temperature is between about 550° C. and 1000° C. (depending upon the melting point of the specific material). This temperature "fuses" or bonds the adjacent nanoparticles to each other, to form a coherent coating of the refractory metal or refractory metal carbide on the substrate. This bonding is illustrated in FIG. 9C, in which nanoparticles 901 have bonded as a result of the application of the third temperature.

The foregoing temperatures used to form the refractory metal or refractory metal carbide coating are well below those necessary to form refractory metal or refractory metal carbide coatings using other approaches. Accordingly, an important advantage of the present invention is the ability to form refractory metal or refractory metal carbide coatings on materials not previously capable of being so coated. For example, in accordance with various embodiments of the present invention, the foregoing method can be used to coat carbon-based materials (e.g., graphite, carbon/carbon composites) and other temperature sensitive materials (e.g., materials that would melt, oxidize, or otherwise not withstand temperatures above 800° C.). Of course, as will be understood by those of skill in the art, the present invention has application to coating a wide range of materials that might enjoy the benefits of a refractory metal or refractory metal carbide coating.

Additionally, the simplicity of "painting" on a refractory metal or refractory metal carbide nanoparticle mixture allows shapes not previously capable of being coated with refractory metal or refractory metal carbides to be coated using the foregoing methods, in accordance with yet other embodiments of the present invention. For example, internal surfaces of complex shapes (e.g., the inner diameter of tubes or nozzles), as well as high-aspect ratio surfaces, can be coated with a refractory metal or refractory metal carbide nanoparticle coating, in accordance with various embodiments of the present invention.

Figure 10:
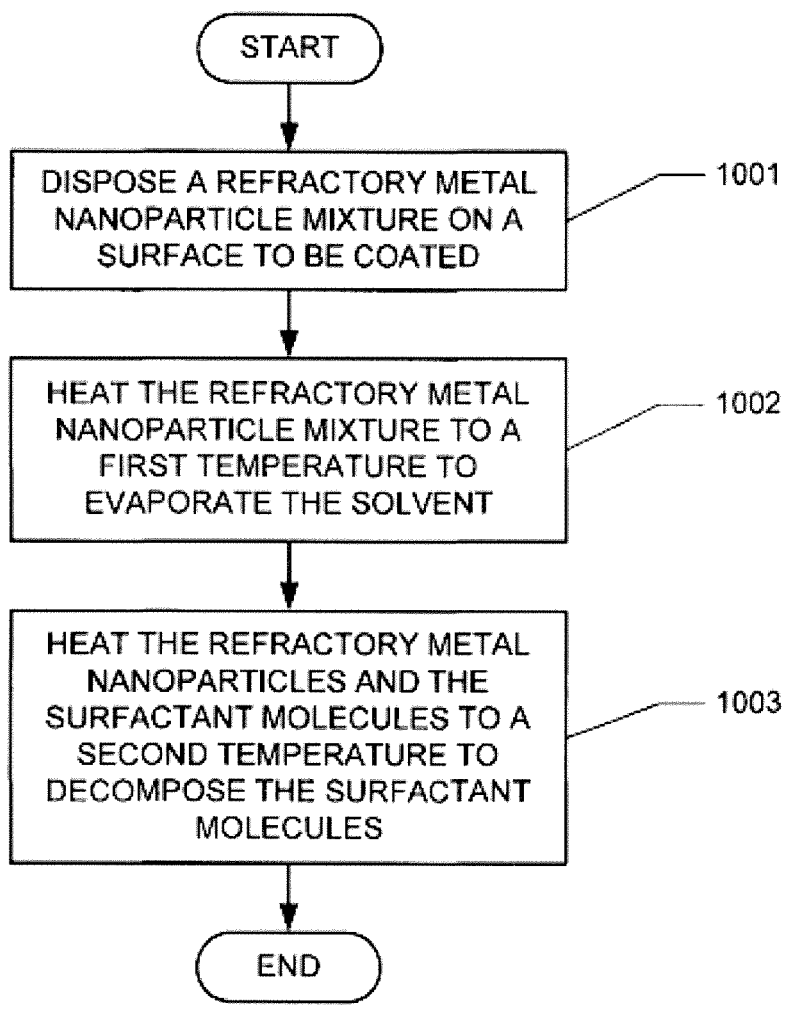
FIG. 10 is a flow chart illustrating a method for forming a refractory metal carbide coating in accordance with one embodiment of the present invention.

According to another embodiment of the present invention, a refractory metal coating may be formed from refractory metal nanoparticles (as opposed to refractory metal carbide nanoparticles). One such exemplary method is set forth in FIG. 10. In step 1001, a refractory metal nanoparticle mixture including refractory metal nanoparticles in a solvent, is provided on a surface to be coated. The refractory metal nanoparticle mixture includes a non-volatile surfactant, which may be provided in layers around the refractory metal nanoparticles by ligand exchange (e.g., exchanging the non-volatile surfactant for the surfactant which originally halted the growth of the nanoparticle, as set forth in greater detail above), or which may be provided in a mixture with the refractory metal nanoparticles (i.e., in addition to the surfactant which surrounds the nanoparticles). Appropriate surfactants include, for example, long chain organics (e.g., with more than 10 carbon atoms and a functional group at one or both ends), such as amines, acids, phosphines, acetylacetonates, thioethers or thiols. Shorter surfactants may be used as well, when another carbon source is dispersed with the metal nanoparticles. That carbon source may be, for example, long chain hydrocarbon (e.g., paraffin wax). Using a secondary hydrocarbon source helps to create a reducing atmosphere that prevents oxidation and/or the incorporation of oxygen into the coating.

In step 1002, the refractory metal nanoparticle mixture is heated to a first temperature to evaporate the solvent and leave the plurality of refractory metal nanoparticles surrounded by surfactant molecules on the surface. In step 1003, the refractory metal nanoparticles and the surfactant molecules are heated to a second temperature to decompose the surfactant molecules, and to react the plurality of refractory metal nanoparticles with carbon from the decomposed surfactant to provide a refractory metal carbide coating on the surface. Due to the high reactivity of the nano-particles, this process can take place at very low temperatures (i.e., much lower than standard carbide processes). A generalized equation illustrating this process is set forth below, where "Nano-M" represents a nanoparticle of refractory metal:

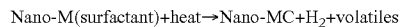

Nano-M(surfactant)+heat→Nano-MC+$H_2$+volatiles

For example, in accordance with one exemplary aspect of the present invention, the nanoparticle of interest may be titanium. Accordingly, a decomposition reaction for this nanoparticle may occur as set forth in the following equation:

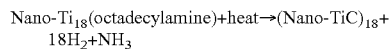

Nano-$Ti_{18}$(octadecylamine)+heat→(Nano-TiC)$_{18}$+ 18$H_2$+$NH_3$

According to one aspect of the present invention, the foregoing method may be practiced with the surface to be coated and the nanoparticle mixture disposed in a chamber filled with inert gas, in order to prevent the surfactant from escaping from the nanoparticle mixture. This may be done when the surfactant which surrounds the nanoparticles functions as the carbon source for the reaction. According to yet another embodiment, however, if another non-volatile carbon source is added, the reaction may occur under atmospheric conditions.

For example, if the surfactant from which the carbon for the carbide is obtained comes not from a layer of octadecylamine surrounding the Ti nanoparticle, but rather comes from a secondary carbon source, such as octadecane, the decomposition reaction may occur as set forth in the following equation:

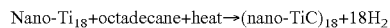

Nano-$Ti_{18}$+octadecane+heat→(nano-TiC)$_{18}$+18$H_2$

According to various aspects of the present invention, the surfactants in the above reaction may include one or more amines such as aliphatic amines, n-butyl amines, pentyl, hexyl, octyl, etc. with one, two or three aliphatic chains attached. The surfactants in the above reaction may also include one or more phosphines or phosphineoxides with multiple (e.g., three) organic chains, such as trioctylphosphineoxide (O=P($C_8H_{17}$)$_3$). It should be noted that phosphines or phosphineoxides with one or more hydrogen atoms on the phosphorous may be undesirably reactive and dangerously toxic.

The foregoing exemplary organic compounds are known to bond well to most transition metal centers and have been shown to stabilize different nanoparticles as well. The early electropositive transition metals such as Zr, Hf, Nb, Ta bond more strongly to oxide functional groups than amines or phosphines. Therefore, phosphine oxides and organic acids are the preferred ligands for these metals as well as long chain alcohols such as octanol, dodecanol, etc. Ti, W and Si exhibit a relative high affinity to nitrogen (e.g., Ti burns in nitrogen atmosphere to TiN) and therefore amines may be a good choice for these metals.

Figure 11:
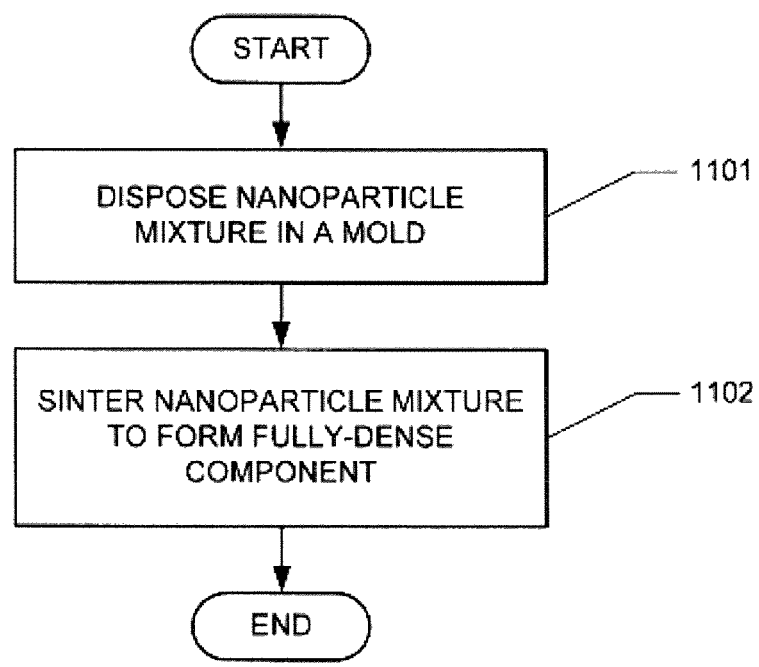
FIG. 11 is a flow chart illustrating a method for forming refractory metal or refractory metal carbide components in accordance with one embodiment of the present invention.

IV. Formation of Bulk Parts:

According to another embodiment of the present invention, refractory metal or refractory metal carbide nanoparticle mixtures may be used to form fully dense components via sintering or hot pressing. For example, FIG. 11 is a flow chart illustrating a method for forming refractory metal or refractory metal carbide components in accordance with one embodiment of the present invention.

The method begins with step 1101, in which a refractory metal or refractory metal carbide nanoparticle mixture is provided in a mold. The mixture includes a solvent and a plurality of refractory metal (or carbide) nanoparticles, each of the nanoparticles being surrounded by a layer of surfactant molecules. In step 1102, the refractory metal nanoparticle mixture is sintered to consolidate the refractory metal component in the shape of the mold. According to various aspects of the present invention, the sintering may alternately comprise spark plasma sintering (SPS) or field assisted sintering (FAST). FAST uses direct resistive heating with a high current (e.g., hundreds of amps, depending on the electrical resistivity of the substrate) and a low voltage (e.g., less than 25 V) to rapidly heat the mixture in the mold, with very moderate pressure applied. This technique is very fast, taking mere minutes, but can nevertheless provide fully dense parts.

Figure 12:
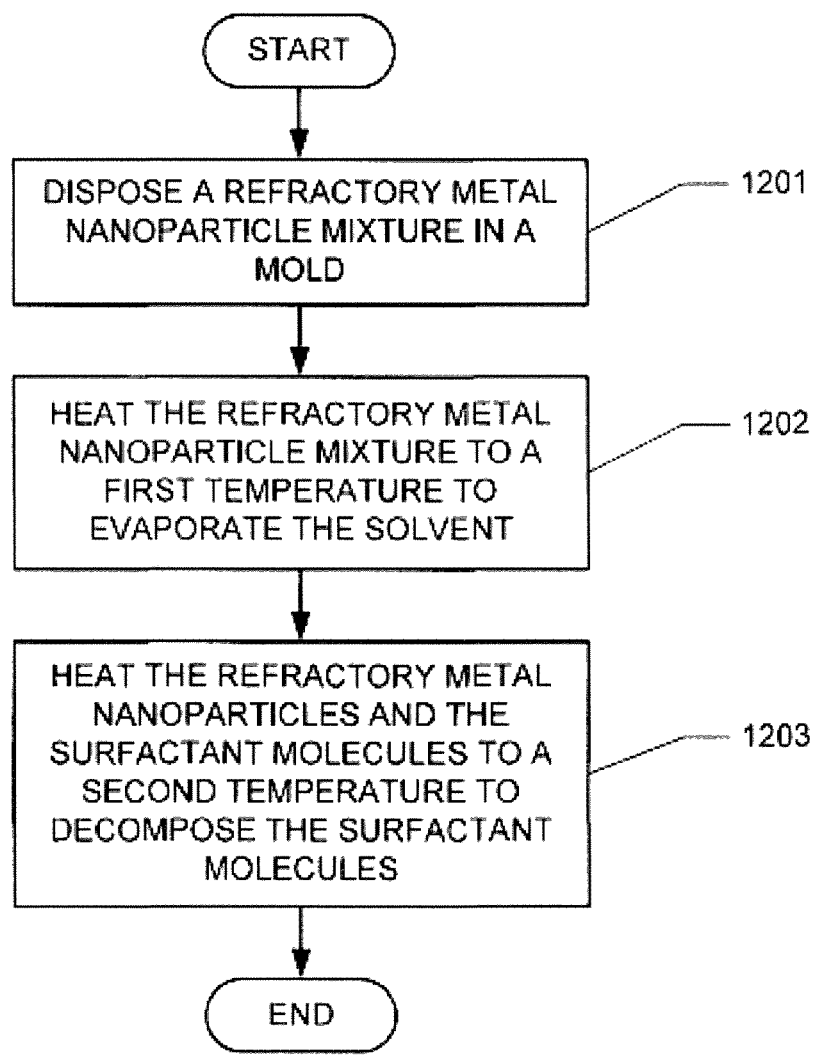
FIG. 12 is a flow chart illustrating a method for forming refractory metal carbide components in accordance with one embodiment of the present invention

According to another embodiment, a refractory metal carbide component can be manufactured from refractory metal nanoparticles (as opposed to refractory metal carbide nanoparticles). One such exemplary method is set forth in FIG. 12. The method begins with step 1201, in which a refractory metal nanoparticle mixture is disposed in a mold. The refractory metal nanoparticle mixture includes a non-volatile surfactant, which may be provided in layers around the refractory metal nanoparticles by ligand exchange (e.g., exchanging the non-volatile surfactant for the surfactant which originally halted the growth of the nanoparticle, as set forth in greater detail above), or which may be provided in a mixture with the refractory metal nanoparticles (i.e., in addition to the surfactant which surrounds the nanoparticles). Appropriate surfactants include, for example, long chain organics (e.g., with more than 10 carbon atoms and a functional group at one or both ends), such as amines, acids, phosphines, acetylactonates, thioethers or thiols. Shorter surfactants may be used as well, when another carbon source is dispersed with the metal nanoparticles. That carbon source may be, for example, long chain hydrocarbon (e.g., paraffin wax). Using a secondary hydrocarbon source helps to create a reducing atmosphere that prevents oxidation and/or the incorporation of oxygen into the component.

In step 1202, the refractory metal nanoparticle mixture is heated to a first temperature to evaporate the solvent and leave the plurality of refractory metal nanoparticles surrounded by surfactant molecules in the mold. In step 1203, the refractory metal nanoparticles and the surfactant molecules are heated to a second temperature to decompose the surfactant molecules and to react the plurality of refractory metal nanoparticles with carbon from the decomposed surfactant to provide a refractory metal carbide component.

Due to the high reactivity of the nano-particles, this process can take place at very low temperatures (i.e., much lower than standard carbide processes). A generalized equation illustrating this process is set forth below, where "Nano-M" represents a nanoparticle of refractory metal:

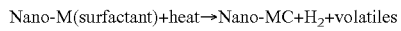

For example, in accordance with one exemplary aspect of the present invention, the nanoparticle of interest may be titanium. Accordingly, a decomposition reaction for this nanoparticle may occur as set forth in the following equation:

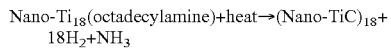

According to one aspect of the present invention, the foregoing method may be practiced with the nanoparticle mixture and the mold disposed in a chamber filled with inert gas, in order to prevent the surfactant from escaping from the nanoparticle mixture. This may be done when the surfactant which surrounds the nanoparticles functions as the carbon source for the reaction. According to yet another embodiment, however, if another non-volatile carbon source is added, the reaction may occur under atmospheric conditions.

For example, if the surfactant from which the carbon for the carbide is obtained comes not from a layer of octadecylamine surrounding the Ti nanoparticle, but rather comes from a secondary carbon source, such as octadecane, the decomposition reaction may occur as set forth in the following equation:

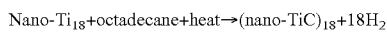

According to various aspects of the present invention, the surfactants in the above reaction may include one or more amines such as aliphatic amines, n-butyl amines, pentyl, hexyl, octyl; etc. with one, two or three aliphatic chains attached. The surfactants in the above reaction may also include one or more phosphines or phosphineoxides with multiple (e.g., three) organic chains, such as trioctylphosphineoxide ($O{=}P(C_8H_{17})_3$). It should be noted that phosphines or phosphineoxides with one or more hydrogen atoms on the phosphorous may be undesirably reactive and dangerously toxic.

The foregoing exemplary organic compounds are known to bond well to most transition metal centers and have been shown to stabilize different nanoparticles as well. The early electropositive transition metals such as Zr, Hf, Nb, Ta bond more strongly to oxide functional groups than amines or phosphines. Therefore, phosphine oxides and organic acids are the preferred ligands for these metals as well as long chain alcohols such as octanol, dodecanol, etc. Ti, W and Si exhibit a relative high affinity to nitrogen (e.g., Ti burns in nitrogen atmosphere to TiN) and therefore amines may be a good choice for these metals.

According to one aspect of the present invention, refractory metal carbide coatings and components, whether manufactured from refractory metal nanoparticles or refractory metal carbide nanoparticles, enjoy enhanced deformation characteristics similar to those of metals. In this regard, nanostructured carbide components and coatings formed according to one of the exemplary methods of the present invention exhibit deformation before failure. This is advantageous, since many ceramics are brittle below their ductile-to-brittle transition temperature. This low temperature brittleness often leads to low temperature failure. A nano-grained structure coupled with a stable grain size allows the material to deform along its grain boundaries, as the nanoparticles therein exhibit a large number of unsaturated or "dangling" bonds that form a very strong connection to their neighboring particles. During deformation, some bonds may be broken, but there are many others that do not break, keeping the coating or bulk part solid. This process is similar to that which occurs in the deformation of metals.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for forming a refractory metal carbide coating, the method comprising the steps of:
    providing a refractory metal nanoparticle mixture including a solvent and a plurality of refractory metal nanoparticles, each of the plurality of refractory metal nanoparticles being surrounded by a layer of surfactant molecules;
    disposing the refractory metal nanoparticle mixture on a surface to be coated;
    heating the refractory metal nanoparticle mixture to a first temperature to evaporate the solvent and leave the plurality of refractory metal nanoparticles surrounded by surfactant molecules on the surface; and
    heating the plurality of refractory metal nanoparticles and the surfactant molecules while on the surface to a second temperature to thermally decompose the surfactant molecules and to react the plurality of refractory metal nanoparticles with carbon from the decomposed surfactant to provide a refractory metal carbide coating on the surface.

2. The method according to claim 1, wherein the refractory metal carbide coating comprises a carbide of a refractory metal chosen from the group consisting of titanium (Ti), zirconium (Zr), hafnium (Hf), niobium (Nb), tantalum (Ta), tungsten (W), and silicon (Si).

3. The method according to claim 1, wherein the surfactant comprises a hydrocarbon.

4. The method according to claim 1, wherein the heating to the second temperature occurs in an inert gas chamber.

* * * * *